US012077422B2

(12) United States Patent
Schüßler et al.

(10) Patent No.: US 12,077,422 B2
(45) Date of Patent: Sep. 3, 2024

(54) DEVICE FOR TRANSPORTING A TRANSPORT ITEM, AND METHOD

(71) Applicant: Kaup GmbH & Co. KG Gesellschaft für Maschinenbau, Aschaffenburg (DE)

(72) Inventors: David Schüßler, Aschaffenburg (DE); Peter Schlott, Aschaffenburg (DE)

(73) Assignee: Kaup GmbH & Co. KG Gesellschaft für Maschinenbau, Aschaffenburg (DE)

( * ) Notice: Subject to any disclaimer, the term of this patent is extended or adjusted under 35 U.S.C. 154(b) by 217 days.

(21) Appl. No.: 17/638,302

(22) PCT Filed: Aug. 31, 2020

(86) PCT No.: PCT/DE2020/000197

§ 371 (c)(1),
(2) Date: Apr. 15, 2022

(87) PCT Pub. No.: WO2021/052518

PCT Pub. Date: Mar. 25, 2021

(65) Prior Publication Data

US 2022/0402739 A1 Dec. 22, 2022

(30) Foreign Application Priority Data

Aug. 30, 2019 (DE) ..................... 10 2019 006 140.3

(51) Int. Cl.
*B66F 9/16* (2006.01)
*B66F 9/20* (2006.01)

(52) U.S. Cl.
CPC . *B66F 9/16* (2013.01); *B66F 9/20* (2013.01)

(58) Field of Classification Search
CPC .................................. B66F 9/16; B66F 9/165
See application file for complete search history.

(56) References Cited

U.S. PATENT DOCUMENTS 3,726,427 A * 4/1973 Carlund .................... B66F 9/16 414/642
5,586,620 A * 12/1996 Dammeyer ............ B66F 9/122 414/641

(Continued)

FOREIGN PATENT DOCUMENTS

DE 102008023531 A1 11/2009
DE 102013114940 A1 7/2015

(Continued)

*Primary Examiner* — Mark C Hageman
(74) *Attorney, Agent, or Firm* — Smartpat PLC

(57) ABSTRACT

A device for transporting a transport item and for attaching to a lifting vehicle, in particular for attaching to the transport apparatus of a forklift truck, said vehicle in particular comprising a mast means and said device comprising: a longitudinal transport means, more particularly a fork means, for at least temporarily receiving the transport item, in particular two or more longitudinal transport means; a tilting means for longitudinally tilting the longitudinal transport means, more particularly fork means, in particular two or more longitudinal transport means; and at least one electromechanical actuator means, in particular for linear displacement, said actuator means acting on an attachment region of the longitudinal transport means, in particular multiple longitudinal transport means, in order to tilt said transport means.

6 Claims, 5 Drawing Sheets

(56) References Cited

U.S. PATENT DOCUMENTS

| | | | | |
|---|---|---|---|---|
| 5,788,016 A * | 8/1998 | Soulas | B66F 9/16 | |
| | | | 187/238 | |
| 6,851,915 B2 * | 2/2005 | Warner | B66F 9/122 | |
| | | | 414/667 | |
| 10,494,240 B2 * | 12/2019 | Matti | B66F 9/16 | |
| 10,640,349 B2 * | 5/2020 | Prentice | B66F 9/146 | |
| 11,591,198 B2 * | 2/2023 | Dieringer | B66F 9/16 | |
| 2008/0152471 A1 * | 6/2008 | Polvilampi | B66F 9/16 | |
| | | | 414/668 | |

FOREIGN PATENT DOCUMENTS

| | | |
|---|---|---|
| EP | 3173372 B1 | 5/2017 |
| GB | 2266700 A | 11/1993 |
| JP | H082895 A | 1/1996 |

* cited by examiner

DEVICE FOR TRANSPORTING A TRANSPORT ITEM, AND METHOD

TECHNICAL FIELD

The disclosure relates to a device for transporting a transport item for attaching to a lifting vehicle, in particular to a transport device of a forklift truck, and to a method for producing a device for transporting a transport item.

BACKGROUND

It is known to tilt a longitudinal transport means for at least temporarily picking up the transport item, in particular a fork means, by means of the lift mast tipping of a lifting vehicle. While a small tilt angle of close to 0° is required to drive into a pallet, the load should be tilted as far back as possible when being transported, which prevents the load from sliding down. Thus, the tilt function is an important additional function for safely transporting and receiving loads.

It is disadvantageous that a lift mast tilting results in an imprecise adjustment that is highly individually dependent on the driver.

SUMMARY

An object of the present disclosure is to provide a simple and safe handling of a transport item, wherein a tilting function is provided.

The object is achieved by a device for transporting a transport item for attaching to a lifting vehicle, in particular with a mast means, in particular to a transport device of a forklift truck, comprising a longitudinal transport means for at least temporarily receiving the transport item, in particular fork means, in particular two or more longitudinal transport means, a tilting means for the longitudinal tilting of the longitudinal transport means, in particular fork means, in particular two or more longitudinal transport means, comprising at least one electromechanical actuator means, in particular for linear adjustment, which acts on an attachment region of the longitudinal transport means, in particular a plurality of longitudinal transport means, for tilting.

The present disclosure provides an electrically driven tiltable attachment, which can optionally be equipped as a sideshift attachment, which also has an advantageous tilt capability. Due to the advantageous structure, the interference contour becomes smaller, as does the weight. The device provides a highly flexible device that can be adjusted to the respective transport situation, which at the same time fulfills safety regulations and can be designed to be adaptable to various lifting vehicles, wherein a reduction or replacement of the hydraulic system takes place. Maintenance and repairs require significantly less effort and, on the other hand, hydraulic oil is no longer necessary, which protects the environment. In addition, it is easier to connect the electrical attachment to an industrial truck, and in particular they can be quickly disconnected from the industrial truck by means of a plug-in connection. It is also easier to equip smaller devices such as hand lifting carriages with special functions, since only a power supply needs to be provided.

The device can move to an exact angular position in a simple manner according to a corresponding specification and is connected to the industrial truck, for example, by means of a CAN bus interface. Advantageously, a tilt of the attachment of approximately +2° to the front and −4° back includes purely electric. A positioning of the tilt angle position can be set to preset values, in particular with display of the angle position, in particular in a control display in the industrial truck, wherein in particular an operation via preselection, in particular by means of a touch display or manually via joystick, takes place. The device can accommodate large loads, wherein the attachment has the smallest possible front end dimension.

Other advantages include the easier use of position measurement systems, which provide accurate and automatic positioning, along with space savings, and good visibility for the operator.

It is advantageous if the electromechanical actuator means has an electrodynamic active means for linear adjustment, in particular an electric motor, in particular a DC motor and/or an synchronous/asynchronous motor and/or a linear motor and/or a plunger coil, in particular an electric adjustment cylinder.

It is advantageous if the at least one or more electromechanical actuator means, in particular electric adjustment cylinders, is/are arranged vertically or horizontally and/or two electromechanical actuator means, in particular electric adjustment cylinders, are arranged parallel to one another in the tilting means, in particular vertically or horizontally and/or the force effect of the electromechanical actuator means in the case of vertical arrangement is supported on an axis of rotation above the electromechanical actuator means.

It is advantageous if the tilting means comprises a lift carriage means, which is provided in particular for arrangement on a mast means and/or in particular for longitudinal travel on a mast means and on which the at least one electromechanical actuator means is arranged in a supported manner, in particular with an upper end of an electric cylinder on an axis of rotation.

It is advantageous if the lift carriage means has a holding frame, wherein a guide contour is provided on an inner side of a vertical supporting arm of the holding frame, wherein an adjusting wheel means is provided on a lower region of the electromechanical actuator means, in particular an electric adjusting cylinder, which is guided in a supportable manner on an inner edge of the guide contour for force transmission, in particular by means of guide rollers, which are arranged in a displaceable manner in the guide contour.

The actuator means are advantageously laid out vertically, with a guide system for the tilt adjustment by a pivoting lift carriage means, whereby a large part of the forces are absorbed.

The device is advantageously more finely adjustable. Further, a relief for cylinders over edges can be undertaken. Advantageously, an angular position can also be read off the holding frame without a sensor system.

It is advantageous if the lift carriage means has a holding frame, wherein the at least one electromechanical actuator means, in particular an electric adjustment cylinder, is arranged at a lower end on a tilt lever element, which is arranged in a tippable manner on a lower region of the holding frame and is arranged to act in a tilting manner on the lower attachment region of the longitudinal transport means. The device is easy to mount and control. A path measurement and determination of the tilting is advantageously possible.

It is advantageous if a traverse spindle with a worm drive is arranged horizontally with an electric motor, with a transmission means for driving the tilting means. For example, an electric motor can be attached to the center of a device with longitudinal transport means and ensures tilting by means of rotation. There is no need for a guide system for the tilting; the electric motor can absorb all load forces. The device is compact with only one gear ratio and has a simple control.

It is advantageous if the longitudinal transport means is arranged on a lateral adjustment means (side shifter) for the longitudinal transport means in the lateral direction and the lateral adjustment means, which is in particular integrated in a lift mast and/or is attachable to the lift carriage means, is tiltable by the tilting means, such that, in doing so, the longitudinal transport means attached to the lateral adjustment means as well is/are to be tilted and/or the lateral adjustment means comprises an electromechanical actuator means, in particular one or more linear actuators, wherein the electromechanical actuator means is/are arranged in particular parallel to the lateral direction.

Thus, the additional function of sideshift can also be operated electrically in combination; advantageously it is displaceable by at least approximately +/−50 mm. The tilt system and the sideshift advantageously have a common electrical control that is supplied with electrical power. This supplies the drive with electrical energy and converts it into mechanical energy. Subsequently, the two systems, tilt and sideshift, separate from each other, and each has its own mechanical guidance system. The mechanical force of the systems is passed on to the longitudinal transport means and thus also to the load, which can now be lifted, tilted and moved laterally.

It is advantageous if a measuring means for measuring a tilt angle of the longitudinal transport means for at least temporarily receiving the transport item, wherein in particular the measuring means comprises an integrated measuring means, in particular in a manner integrated in a control means and/or the tilting means, wherein in particular the measuring means comprises a sensor means, in particular a mechanical sensor and/or an electrical sensor and/or a hydraulic sensor, wherein the measuring means comprises a sensor means, which is provided in a manner corresponding to an initial position and/or an end position of the tilt adjustment of the longitudinal transport means for at least temporarily receiving the transport item and/or the tilting means for the tilt adjustment, and/or a control means and/or regulating means, in particular a magnetic control and/or a micro-PLC control, for controlling and/or regulating the tilt angle by means of a tilting means for a travel path of the electromechanical actuator, in particular a cylinder travel path of the electric cylinder, wherein, in particular with the aid of the measuring means, the angular adjustment of the longitudinal transport means is to be limited to a predetermined length via the control means and/or regulating means and the tilting means, and/or the measuring means and/or the control means and/or regulating means are accommodated in the lifting vehicle.

The object is also achieved by a method for producing a device for transporting a transport item for attaching to a lifting vehicle, in particular to a transport device of a forklift truck, in particular with a mast means, in particular to a transport device of a forklift truck, comprising a longitudinal transport means for at least temporarily receiving the transport item, in particular fork means, in particular two or more longitudinal transport means, wherein a tilting means is used for the longitudinal tilting of the longitudinal transport means, in particular fork means, in particular two or more longitudinal transport means, comprising at least one electromechanical actuator means, in particular for linear adjustment, which is arranged to act on an attachment region of the longitudinal transport means, in particular multiple longitudinal transport means, for tilting.

Further features and advantages of the invention are apparent from the claims and the following description, in which exemplary embodiments of the subject matter of the invention are explained in more detail in conjunction with the drawings.

DETAILED DESCRIPTION

Figure 1:
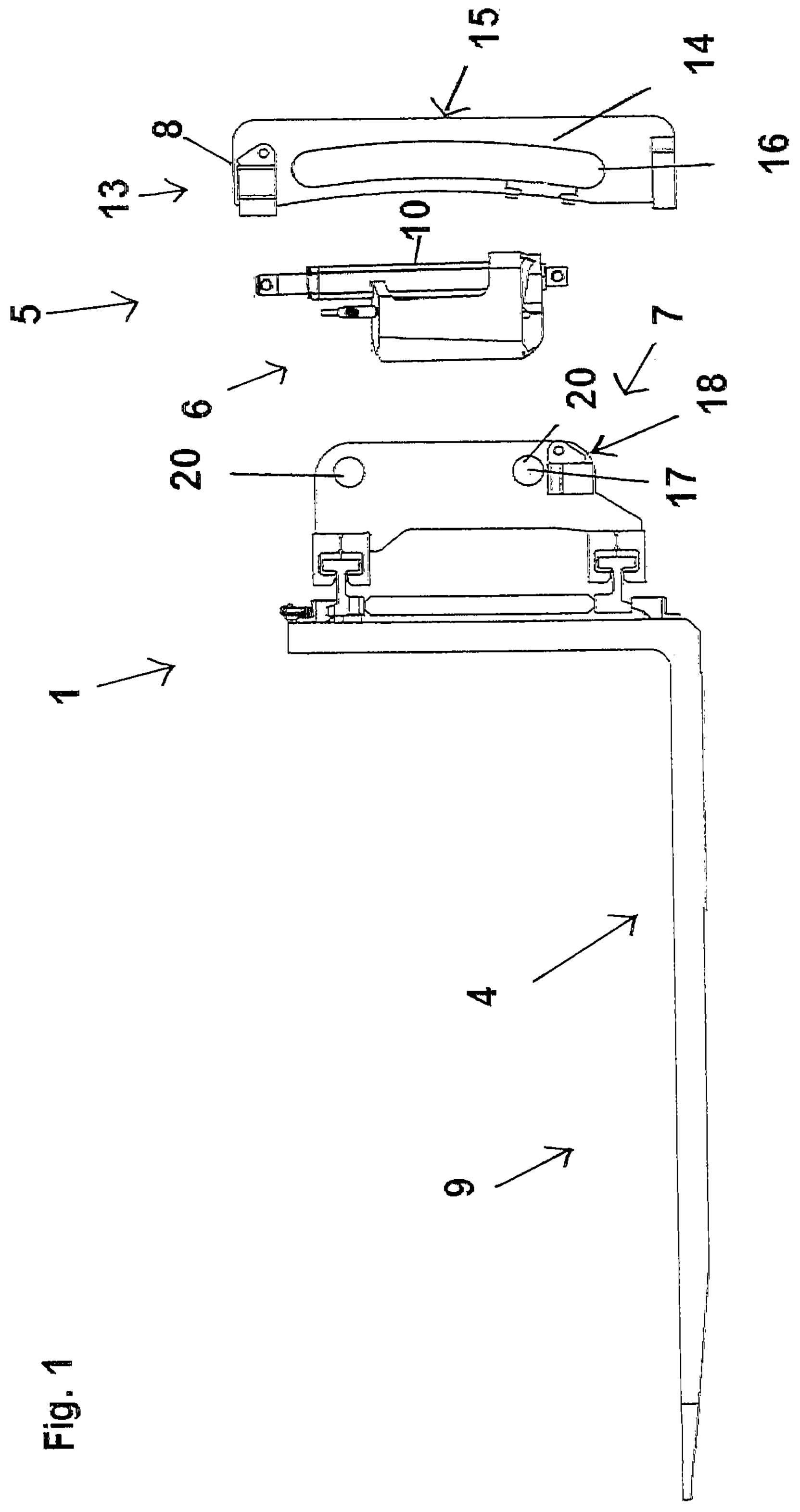
FIG. 1 shows an exploded view of a device for transporting a transport item.

FIG. 1 shows an exploded view of a device 1 for transporting a transport item for attaching to a lifting vehicle (not shown), in particular with a mast means (not shown), in particular on a transport device of a forklift truck (not shown), comprising exemplary longitudinal transport means 4 for at least temporarily receiving the transport item, in particular fork means 9, in particular two or more longitudinal transport means 4, a tilting means 5 for the longitudinal tilting of the longitudinal transport means 4, in particular fork means 9, in particular two or more longitudinal transport means 4, comprising at least one electromechanical actuator means 6, in particular for linear adjustment, which acts on an attachment region 7 of the longitudinal transport means 4, in particular multiple longitudinal transport means, for tilting, wherein the electromechanical actuator means 6 has an electrodynamic active means for linear adjustment, in particular an electric motor, in particular a DC motor and/or synchronous/asynchronous motor and/or a linear motor and/or a plunger coil, in particular an electric adjustment cylinder 10.

Figure 2:
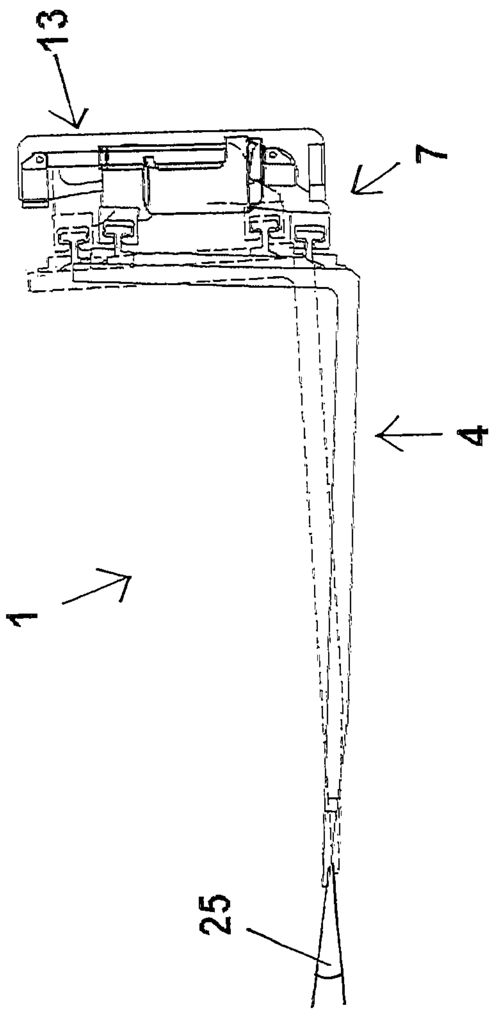
FIG. 2 shows a device for transporting a transport item.

FIG. 2 shows a device 1 with a lift carriage means 13 with exemplary tilt settings with tilt angle 25.

Figure 3:
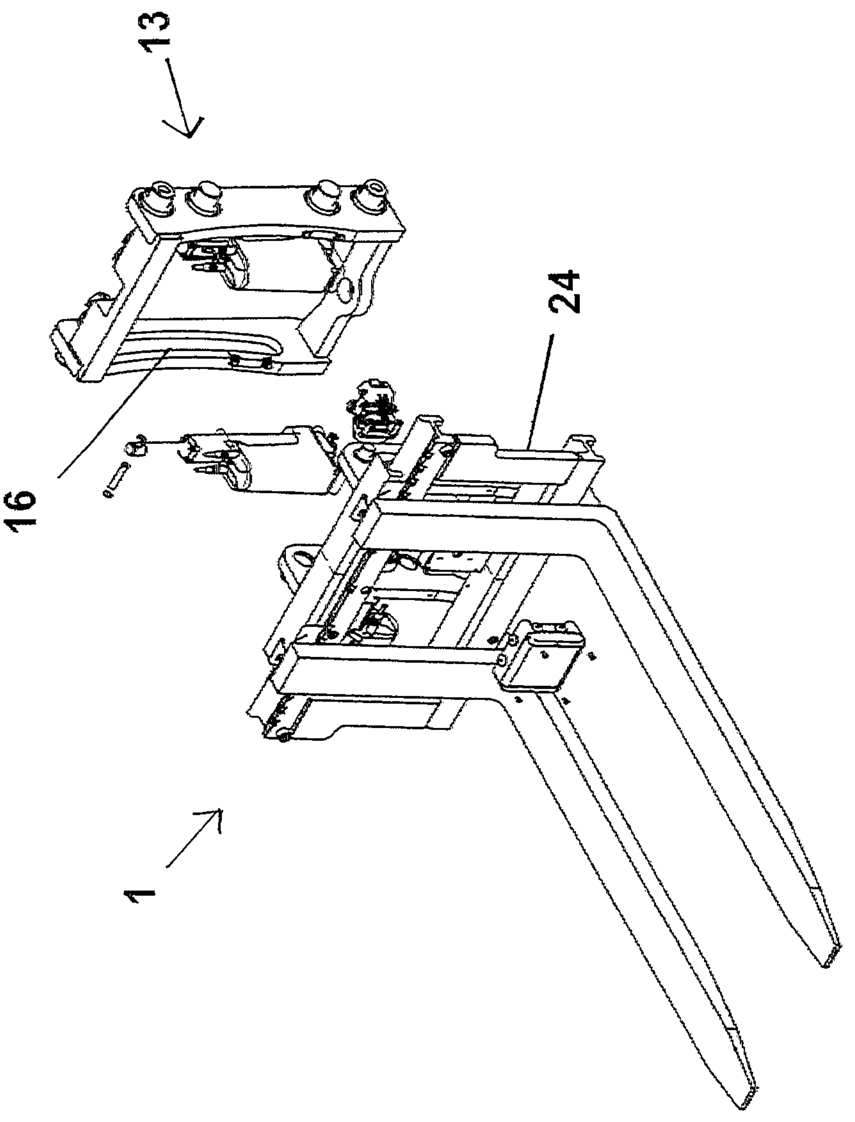
FIG. 3 an exploded perspective view of a device for transporting a transport item.

FIG. 3 shows a device 1 in a perspective exploded view and advantageously with lateral adjustment means 24.

Figure 4:
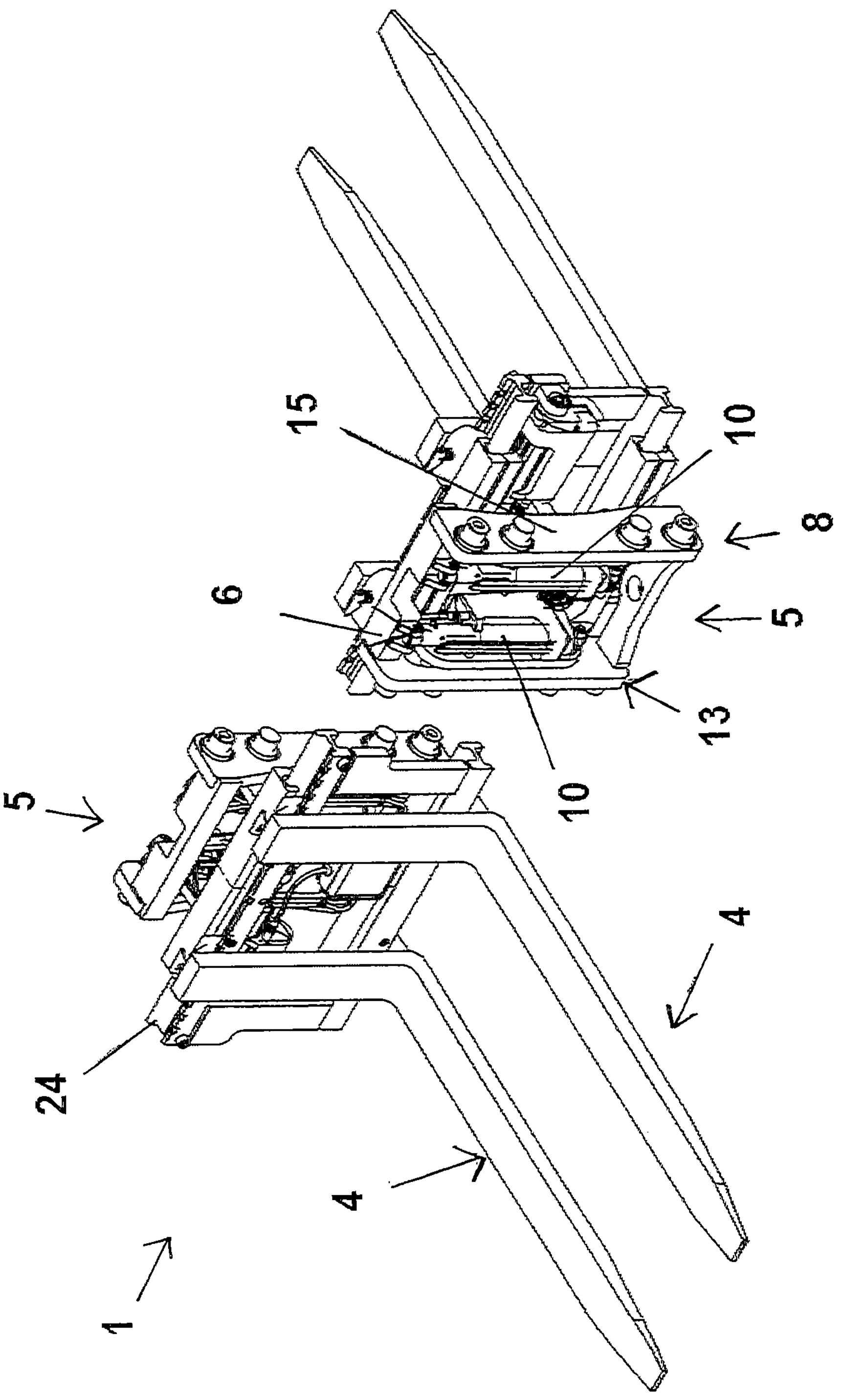
FIG. 4 shows a device for transporting a transport item.

FIG. 4 shows a device 1 with two electric adjustment cylinders 10, and exemplarily with lateral adjuster 24.

Figure 5A:
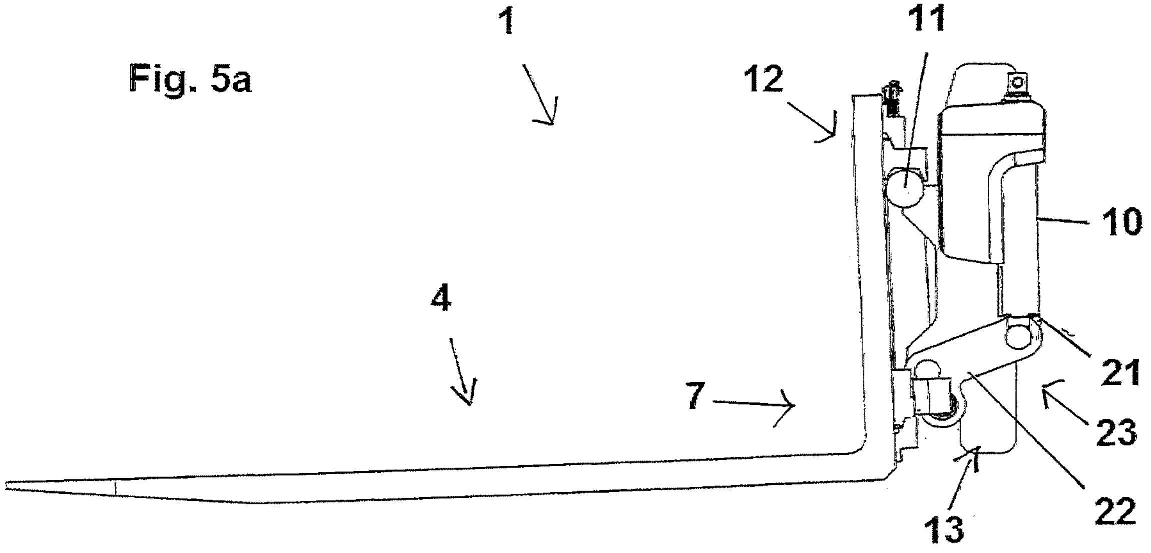
FIGS. 5*a-c* a show a device for transporting a transport item in tilted positions.
Figure 5B:
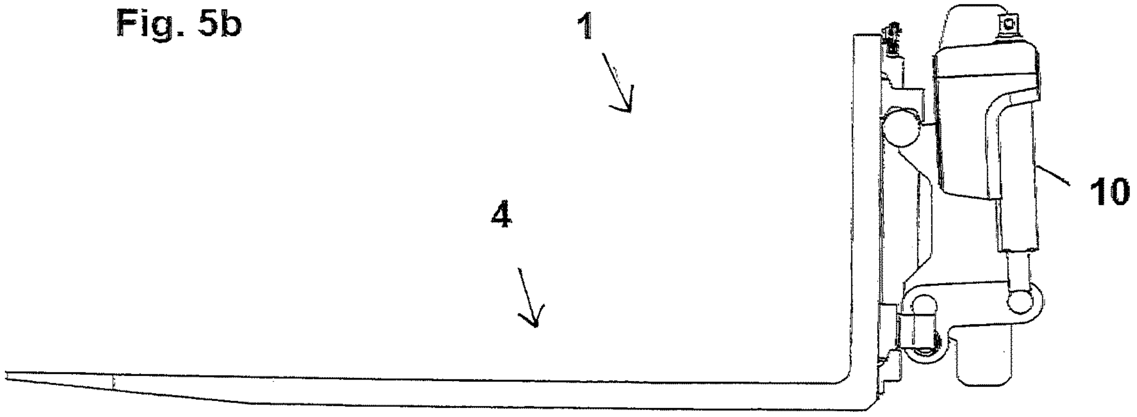
Figure 5C:
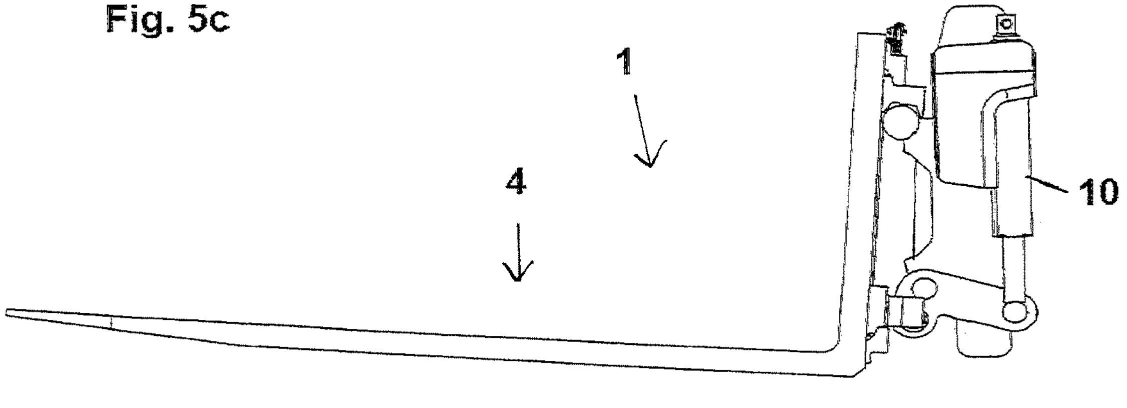

FIGS. 5*a-c* show a device 1 in various tilting positions. The lift carriage means 8 has a holding frame 13, wherein the at least one electromechanical actuator means 6, in particular the electric adjustment cylinder 10, is arranged at a lower end 21 on a tilt lever element 22, which is arranged in a tippable manner on a lower region 23 of the holding frame 13 and is arranged to act in a tilting manner on the attachment region 7 of the longitudinal transport means 4.

LIST OF REFERENCE SIGNS

1 Device for transporting
4 Longitudinal transport means
5 Tilting means
6 Electromechanical actuator
7 Attachment region
8 Lift carriage means
9 Fork means
10 Electric adjustment cylinder
11 Axis of rotation
12 Upper end
13 Holding frame

14 Inner side
15 Supporting arm
16 Guide contour
17 Adjusting wheel means
18 Lower region
20 Guide roller
21 Lower end
22 Tilt lever element
23 Lower region
24 Lateral adjustment means
25 Tilt angle

The invention claimed is:

1. A device (1) for transporting a transport item, the device being configured for attaching the device to a lifting vehicle, comprising:

a longitudinal transport means (4) for at least temporarily receiving the transport item;

a holding frame (13) configured for arrangement on a mast of the lifting vehicle;

a guide contour (16) provided on an inner side (14) of a vertical supporting arm (15) of the holding frame (13);

guide rollers (20) extending from an attachment region (7) of the longitudinal transport means (4) and displaceably arranged within the guide contour (20) for tiltably mounting the longitudinal transport means (4) to the holding frame (13); and an electromechanical actuator (6) having an upper end that is pivotally supported on the holding frame and a lower end that acts on the attachment region (7) of the longitudinal transport means (4) for tilting.

2. The device according to claim 1, wherein the electromechanical actuator (6) comprises at least one of an electrodynamic active means for linear adjustment, an electric motor, a DC motor, a synchronous motor, an asynchronous motor, a linear motor, a plunger coil, and an electric adjustment cylinder (10).

3. The device according to claim 1, wherein the longitudinal transport means (4) is arranged on a side shifter (24) for moving the longitudinal transport means (4) in lateral direction and wherein the side shifter (24) is arranged to be tilted jointly with the longitudinal transport means (4).

4. The device according to claim 1, further comprising a measuring sensor for measuring a tilt angle (25) of the longitudinal transport means (4) for controlling the electromechanical actuator (6).

5. The device according to claim 1, wherein the guide contour (16) is arcuate.

6. The device according to claim 1, wherein the guide contour (16) is forwardly concave.

* * * * *